April 7, 1925.
C. E. REED
1,532,551
ROTARY DEEP WELL DRILLING APPARATUS
Filed June 18, 1920 2 Sheets-Sheet 1
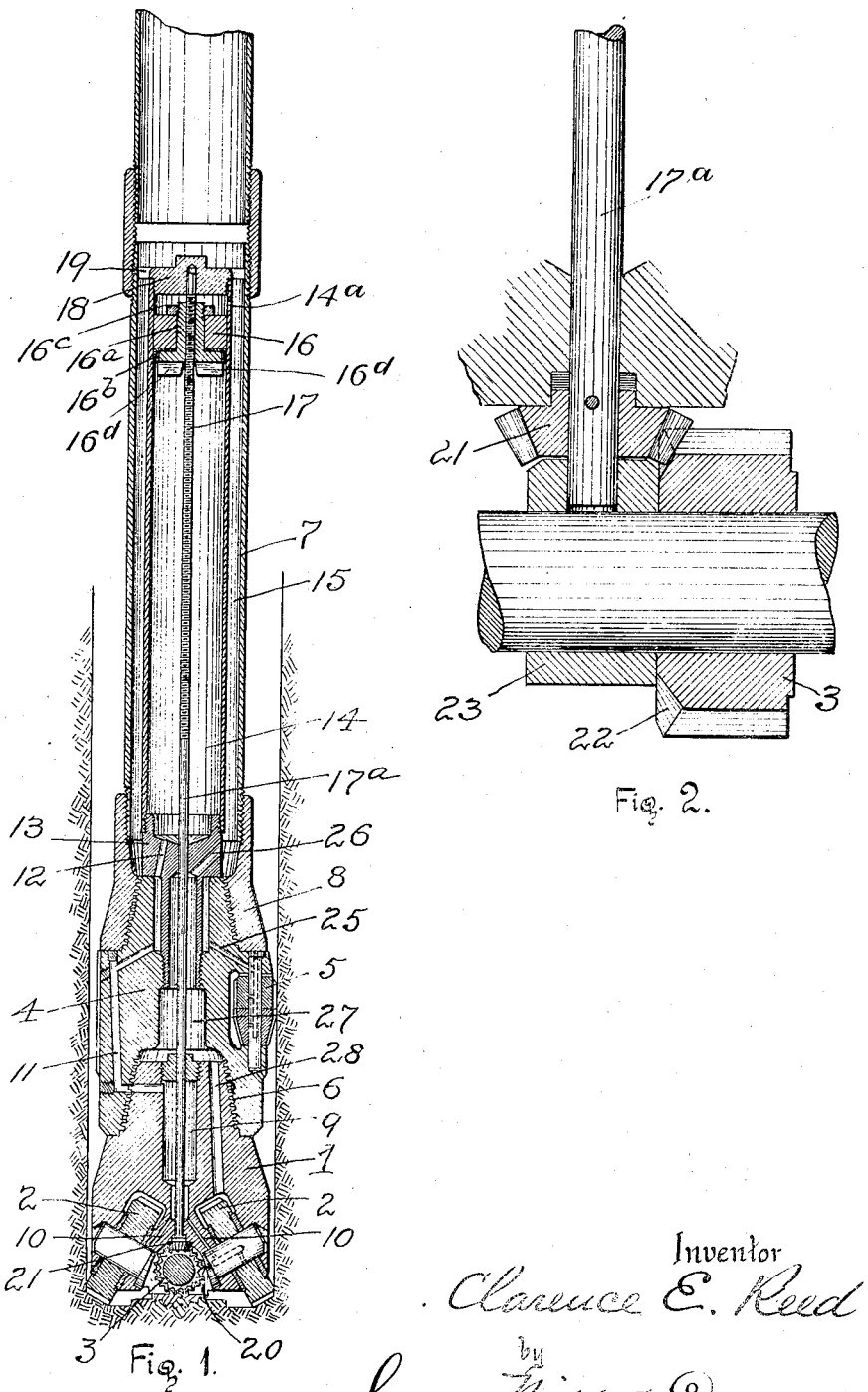

April 7, 1925.  1,532,551

C. E. REED

ROTARY DEEP WELL DRILLING APPARATUS

Filed June 18, 1920   2 Sheets-Sheet 2

Inventor:

Clarence E. Reed, by Spear, Middleton, Donaldson & Hall
Attys.

Patented Apr. 7, 1925.

1,532,551

UNITED STATES PATENT OFFICE.

CLARENCE E. REED, OF HOUSTON, TEXAS, ASSIGNOR TO REED ROLLER BIT COMPANY, A CORPORATION.

ROTARY DEEP-WELL-DRILLING APPARATUS.

Application filed June 18, 1920. Serial No. 389,890.

*To all whom it may concern:*

Be it known that I, CLARENCE E. REED, a citizen of the United States, and resident of Houston, Texas, have invented certain new and useful Improvements in Rotary Deep-Well-Drilling Apparatus, of which the following is a specification.

My invention relates to deep well drilling apparatus and concerns particularly means for lubricating the bearings of the roller cutters. The invention consists in the features and combination of parts hereinafter described and particularly pointed out in the appended claims.

In the accompanying drawings,

Figure 1 is a vertical sectional view of the drill head and a portion of the drill stem, illustrating also the position of the drilling apparatus in the well.

Figure 2 is a detail sectional view.

Figure 4:
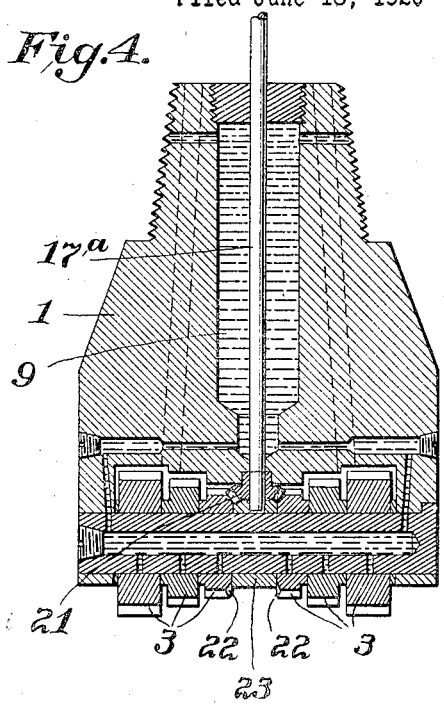
Figure 4 is a detail sectional view.

In carrying out my invention I utilize the rotary motion of the drilling apparatus to impart movement to a lubricant feeder.

In the form of apparatus which I have used as illustrative of my invention, one of the roller cutters is shown as the means whereby motion is transmitted to the lubricant feeder for operating the same to feed the lubricant to the bearings of the roller cutters. This, however is to be regarded as representative of any member deriving its power from the rotation of the drilling apparatus which may be employed as the means for imparting power to the lubricant feeder to cause it to perform its feeding operation. In the drawings, 1 indicates a drill head or body having side cutters 2 and a cross roller cutter organization indicated at 3. This drill head or body may be of various forms and connected up with the drill stem in various ways, but in the particular construction shown, I employ as a part of said drill head or body a reamer block 4, carrying reaming cutters 5 to ream out the side of the hole, and to this reamer block the drill head is connected by screw threads at 6.

The reamer block is connected with the drill stem 7 by a coupling 8.

The drill head is formed with a pocket or chamber 9 for containing lubricant and from this pocket channels 10 extend to the bearings to be lubricated and this distribution of the lubricant takes place to the bearngs of the side cutters as well as to the bearings of the cross roller cutters. The lubricant containing pocket 9 is connected through a conduit 11 with a port 12 extending through a coupling 13 which supports the oil reservoir or lubricant holder 14. This oil reservoir is of cylindrical form and is arranged coaxially with the drill stem, leaving an annular space 15 between these parts for the flow of the water which is employed to flush out the cuttings from the hole as the work of drilling progresses. Within the oil reservoir 14 a piston 16 is located on a screw shaft 17 which has its bearing at its upper end in a cap 18 closing the upper end of the reservoir, suitable spacing projections 19 being provided to support the upper end of the reservoir against lateral strain or displacement. The shaft 17 extends down through the coupling 13 the reamer block and through the oil pocket 9 to a point within the central recess 20 at the lower end of the drilling head, and upon this lower end of the shaft 17 a bevel gear 21 is mounted and this meshes with teeth 22 formed at the end of one of the roller cutters belonging to the cross roller cutter. When the drill is in operation it is rotated by power applied at its upper end and the roller cutters bearing against the wall of the hole being formed will be rotated, this being true of the side cutters and of the sections of the cross roller cutter and therefore the teeth 22 on the innermost section of the cross roller cutter will rotate the gear 21, and its shaft 17, and as this shaft is screw threaded the piston 16 will be moved downwardly in the oil reservoir 14 and the oil will be forced through the port 12, conduit 11, pocket 9 and channels 10 to the bearings of the roller cutters, and this feeding action will take place to the bearings of the cross roller cutters as well as to the bearings of the side cutters and also to the bearings of the reamer cutters to which channels 25 extend.

The flushing water passing down through the annular space 15 will be conducted by a port or ports 26 to the bore 27 of the reamer block and thence through conduits 28 to the cutters, so as to flush them and clear the cuttings therefrom. A vent opening 14ª may be employed through the wall of the oil reservoir 14 at a point above the piston 16 so as to break the vacuum here. The pitch of the thread of the screw rod or shaft 17 may be low so as to get a comparatively slow movement of the piston 16 for each revolution of the shaft, and it will be observed that the power transmitted to this shaft is derived from the innermost section of the cross roller cutter or that section which is nearest to the axis of the drill head. This innermost section of the cross roller has less surface travel than the other sections of this roller lying more remote from the center of rotation of the drill head and this contributes to a slow speed of revolution of the screw shaft 17 per revolution of the drill head.

As shown in Figure 2, the gear 21 may be pinned to the shaft 17.

Figure 3:
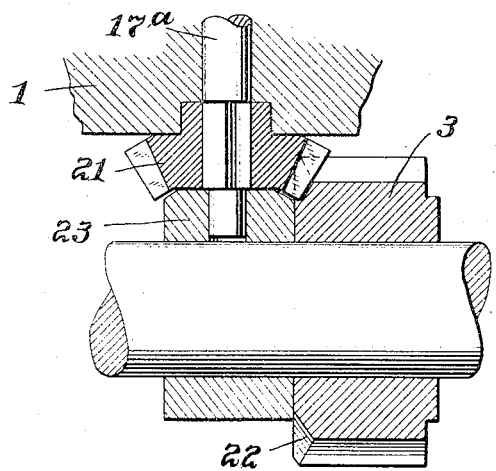
Figure 3 is a view of a detail.

In Figure 3 I show a different form of connection for this gear, it being provided with an opening rectangular in cross section to receive a portion of the shaft which is of corresponding cross section, the said shaft at its lower end being reduced where it bears in the member 23. This construction will enable the shaft to be lifted out without requiring the removal of a fastening pin such as in Figure 2.

It will be understood that the above description and the drawing accompanying the same are to be regarded as illustrative of my invention and not as restrictive upon the scope of my invention which is defined by the appended claims.

The screw shaft has a plain portion at 17ª at the lower end of the oil reservoir so that the piston when it reaches the lower end of the reservoir will free itself from the screw thread in order to prevent damage to the parts in case the drill head is continued in rotation after the lower limit of the piston movement has been reached.

The piston may be formed of a split center portion 16ª surrounded by the ring member 16 and a washer 16ᵇ is clamped between the ring and the lower flange of the center 16ª. This center 16ª is screw threaded at its upper end and receives a nut 16ᶜ. The frictional contact between the washer 16ᵇ and the reservoir, will prevent the piston from turning with the screw shaft. If desired, additional means may be used for this purpose and I have shown wings 16ᵈ projecting down from the piston into the heavy lubricant, which will restrain the piston against rotary movement.

As shown in Fig. 4 the journal pin of the cross roller cutters is held against rotation. As one way of fixing this pin it may have an eccentric head, as shown, at the right hand end seated in a socket in the head. This pin is hollow, oil is led thereto, and it has ports for supplying the roller cutters with the lubricant. This pin of Fig. 4 is representative of the pins in the other figures which are shown in a general way.

I claim—

1. In a deep well rotary drilling apparatus, the combination of a drill head, roller cutters including a cross roller cutter arranged with its axis extending transverse to the axis of the rotary drilling apparatus, a lubricant holder, means for feeding lubricant therefrom to the bearings of the roller cutters and a connection from the cross roller cutter to said feeding means for operating the same, as a consequence of the cross roller cutter being driven by contact with the bottom of the hole substantially as described.

2. In a deep well rotary drilling apparatus, the combination of a drill head having side cutters and cross roller cutter means arranged between the side cutters, a lubricant holder and means for feeding the lubricant from the holder to the bearings of the cutters, operated from said cross cutter means, when driven by contact with the bottom of the hole substantially as described.

3. In combination in a deep well rotary drilling apparatus, a drill head carrying roller cutters including a cross cutter arranged substantially centrally of the end of the head and made up of a plurality of roller cutters having rotary movement independent of each other, a lubricant holder, a piston therein and means for operating the piston from one of the roller cutters which is nearer the center of rotation of the drilling apparatus, said piston forcing the lubricant to the bearings of the cutters, substantially as described.

4. In combination in a deep well rotary drilling apparatus, a member carrying a roller cutter, a lubricant holder, an axially movable piston therein, a member engaging a part of the bottom of the hole and deriving rotary motion about its own axis as a result of said engagement when the drilling apparatus is rotated and a connection between said member and the piston for operating the same for feeding the oil to the bearings of the cutter, substantially as described.

5. In combination in a deep well rotary drilling apparatus, a member having roller cutters, a lubricant holder, a piston therein for forcing lubricant to the bearings of the roller cutters and a connection geared to one of the roller cutters for operating the said piston, said gear connection comprising teeth on one of the roller cutters, a gear meshing thereinto and a screw shaft carrying the gear and engaging the piston to advance the same, substantially as described.

6. In combination in a deep well rotary drilling apparatus, a drill head having roller cutters, a lubricant holder, a piston therein for forcing lubricant to the bearings of the roller cutters, said roller cutters including a cross roller cutter arranged adjacent the axis of the drilling apparatus and having teeth at its end, a bevel gear arranged coaxially with the drilling apparatus and meshing with the said teeth and a shaft driven by said bevel gear and operating the piston, substantially as described.

7. In combination in a deep well drilling apparatus, a rotary drill head or block, a drill stem, a lubricant holder arranged co-axially of the drill stem, a cross roller cutter at the lower face of the head, means for feeding the lubricant from the holder arranged coaxially with the head and connected with and operated by the cross roller cutter when the latter is rotated by contact with the bottom of the hole upon turning the apparatus.

8. In combination in a deep well rotary drilling apparatus, a drill stem, a head attached thereto, cross roller cutters at the bottom face of the head, a lubricant holder within the drill stem, a piston therein and a connection from the cross roller cutter to the piston for moving the same positively to feed the lubricant, substantially as described.

9. In combination in a deep well drilling apparatus, a drill stem, a head, a lubricant holder, a fixed journal pin in the head, a roller cutter turning on the fixed pin, a piston in the lubricant holder and a connection from the roller cutter for operating the piston, substantially as described.

10. In combination in a deep well drilling apparatus, a drill body having rotary cutters, a hollow drill stem through which flushing fluid passes to the drill body and by which said body is rotated, a lubricant chamber within the drill stem, spaced apart therefrom, for the flow of the flushing fluid, and a coupling for supporting the lubricant chamber from the drill body, said coupling having a pasage for flushing fluid coaxial with the drill stem and body with a port leading thereto from the annular space between the lubricant chamber and the drill stem, and having also a passage leading from the lower end of the lubricant chamber to one side of the axis of the apparatus, said drill body having a passage connecting with the cutters and with the last mentioned passage of said coupling for supplying lubricant to the cutters, substantially as described.

11. In combination in a rotary deep well drilling apparatus, a drill body having rotary cutters with lubricant conveying pasages leading thereto, and having also a flushing fluid conveying passage, a drill stem for rotating the said body and for supplying flushing fluid thereto, a lubricant chamber within and spaced apart from the drill stem, and a coupling member connecting the lubricant chamber with the drill body, said coupling member having a passage connecting with the lower end of the lubricant chamber and with the lubricant passage of the drill body, and having also a passage connecting the annular space between the lubricant chamber and drill stem with the fluid flushing passage of the drill body.

12. In combination in deep well drilling apparatus, a drill bit having cutters, and a central bore for flushing water, and a passage for lubricant, a drill stem, a lubricant holder within the drill stem and spaced apart therefrom for the passage of flushing water, a piston within the said holder, and a member connecting the lubricant holder with the drill bit having one end of smaller diameter than the other and both screw threaded for attachment between said bit and holder, said member having a passage for flushing fluid and a passage for the lubricant, substantially as described.

13. In combination, a rotary drill stem, cutter means thereon, said bit a drill bit, cutter means thereon, said bit having a central bore of two diameters and a connection to the drill stem, a lubricant holder within the drill stem, a coupling member having a hollow reduced stem, and a passage communicating the latter with the annular water space of the drill stem, the stem of said coupling member being threaded for connection with the wall of the bit bore of small diameter, said coupling member also having a passage connecting the lubricant holder with the bore of the bit of larger diameter, and a piston in the holder for forcing lubricant therefrom.

14. A member for coupling a coaxially disposed tubular lubricant holder to a drill body having two passageways, one axially disposed and the other eccentrically disposed, said member comprising a body threaded at its opposite ends and provided with two ports complemental to the passageways in the drill body, one of said ports opening out at one end through the bottom of the body axially thereof and at its opposite end through a side wall of the body.

15. The combination with a drill including a body, rotary cutters carried thereby, said body having a water passageway located axially therein, and an eccentrically disposed oil passageway, a tubular drill stem connected to the body for rotating it and a lubricator including a tubular chamber arranged coaxially of the drill stem and spaced apart from the wall of the same, of a member for coupling said chamber to the body, said member having ports complemental to the aforesaid passageways in the body, one of the ports opening out through the upper end of the member for communicating with the oil chamber, and the other port opening out at its upper end through the side wall of the member for communicating with the space between the oil chamber and the drill stem, and at its lower end through the member axially of the same for communicating with the axially located passageway in the drill body.

16. In combination, a drill body, rotary cutters therein, said body having oil and water passageways therein, one located axially and the other eccentrically thereof, a drill stem and a tubular member located therein coaxially thereof, said stem and member providing an oil chamber and a water passageway, and a member for connecting the tubular member to the drill body and provided with ports for reversing the direction of flow of the oil and water relative to the axis of the apparatus in the passage of said mediums from the aforesaid oil chamber and water passageway into the aforsaid passageways in the drill body.

17. In combination in deep well drilling apparatus, a drill body having rotary cutters, a central bore for flushing water and a conduit for lubricant off to one side of the central bore, a drill stem for rotating said body, a lubricant chamber arranged coaxial with the drill stem and spaced apart therefrom to provide an annular passage for flushing water, and a coupling connecting the lubricant chamber with the drill body, said coupling having a passage connecting the annular flushing water passage with the central bore and a passage connecting the lubricant chamber with the offside lubricant conduit of the drill body, said central bore delivering flushing fluid to the cutters and said offside lubricant conduit delivering lubricant to the cutter bearings, substantially as described.

18. In combination in deep well drilling apparatus, a drill body, having rotary cutters, passages for flushing water and lubricant, a drill stem, a lubricant holder within and spaced apart from the drill stem to provide an annular passage for flushing water and a coupling connecting the lubricant holder with the drill body, said coupling having a central bore coaxial with the drill body connecting with flushing water passage of the body, and a passage connecting said central bore with the annular flushing water passage and having a passage connecting with the lubricant holder and the lubricant passage of the drill body, substantially as described.

19. In combination in a deep well drilling apparatus, a drill body having rotary cutters, a hollow drill stem, a lubricant chamber within and spaced apart from the drill stem to leave a space for the flow of flushing fluid, said apparatus having at the bottom of the lubricant chamber a coupling connecting the lubricant chamber and drill body and having a reduced lower end with a bore coaxial therewith and a passage leading from said flushing fluid space to the said coaxial bore, and a passage leading from the bottom of the lubricant chamber off to one side of the said coaxial bore, said passages communicating with the cutters to lubricate their bearings and to flush said cutters, substantially as described.

20. In combination in a deep well drilling apparatus, a drill head having rotary cutters and conduits leading thereto for conveying lubricant to the bearings of said cutters, a drill stem, a lubricant holding chamber arranged coaxially with the drill stem, a coaxial passage for flushing fluid, for directing the said fluid past the lubricant holder, said head having passages for directing the flushing fluid to the rotary cutters, a piston in the lubricant holder, and a driving connection for said piston geared to one of the rotary cutters for advancing the piston in said lubricant holding chamber, said driving connection holding the said piston against retrograde movement under back pressure of the flushing fluid when the rotary cutters are not rotating, substantially as described.

In testimony whereof, I affix my signature.

CLARENCE E. REED.